United States Patent [19]
Feng

[11] Patent Number: 6,060,861
[45] Date of Patent: May 9, 2000

[54] CAR-USED SPARE POWER SYSTEM QUICK CHARGING DEVICE

[75] Inventor: Hsiu-Mei Feng, Taipei Hsien, Taiwan

[73] Assignee: Long-Well Electronics Corp., Taipei Hsien, Taiwan

[21] Appl. No.: 09/346,291

[22] Filed: Jul. 2, 1999

[51] Int. Cl.[7] .................................................. H02J 7/00
[52] U.S. Cl. ............................................. 320/105; 320/104
[58] Field of Search ..................................... 320/104, 105, 320/114, 108, 153, 154

[56] References Cited

U.S. PATENT DOCUMENTS 4,061,956  12/1977  Brown et al. ........................... 320/153
5,936,384   8/1999  Fujiwara et al. ....................... 320/134

*Primary Examiner*—Edward H. Tso
*Assistant Examiner*—Lawrence Luk
*Attorney, Agent, or Firm*—Varndell & Varndell PLLC

[57] ABSTRACT

A car-used spare power system quick charging device including a switch, a boosting circuit, a detecting circuit, an indicating circuit, an unstable circuit, a pulse cutting circuit and multiple charging batteries. The detecting circuit serves to detect the voltage state of the charging battery. The indicating circuit serves to indicate the voltage state of the charging battery detected by the detecting circuit. The switch is used to switch the charging/discharging modes. When the charging battery is detected to be in middle or low voltage state, the boosting circuit serves to boost the charging battery into high voltage. The charging battery charges/discharges the car battery by way of pulse so as to protect the charging battery from damage due to over-heating and make the charging battery 100% release voltage.

4 Claims, 3 Drawing Sheets

CAR-USED SPARE POWER SYSTEM QUICK CHARGING DEVICE

BACKGROUND OF THE INVENTION

The present invention relates to a car-used spare power system quick charging device which is able to boost middle or low voltage into high voltage and quickly charge/discharge the car battery by way of pulse. The quick charging device serves to supply power for outdoor mini-type electric appliances or starting car engine.

It often takes place that a car fails to start due to insufficient power. Under such circumstance, it is often necessary to via wires connect the power supply of another car with the broken car for starting the engine.

In an urban area where many car service stations are located, in the case that the power runs out, a broken car can be conveniently rescued However, in a suburban area, in the case that the power runs out and no spare battery is available, the broken car can be hardly rescued.

A conventional battery charger has been developed for solving the above problem. The battery charger is able to charge the battery without finding a rescue car and via wires connecting the power supply of the rescue car with the broken car. However, it takes about 45 to 60 minutes for such battery charger to charge the battery. This time is 3 to 4 times the charging time of connection between two cars via wires. Therefore, it is quite time-consuming to charge the battery. Moreover, in the case that the charging battery is under middle or low voltage, the voltage difference is small and the charging time will be longer and the voltage can be hardly totally released.

SUMMARY OF THE INVENTION

It is therefore a primary object of the present invention to provide a car-used spare power system quick charging device which is able to boost the voltage of the charging battery.

It is a further object of the present invention to provide the above car-used spare power system quick charging device which is able to quickly charge/discharge the car battery by way of pulse so as to protect the charging battery from damage due to over-heating.

It is still a further object of the present invention to provide the above car-used spare power system quick charging device in which the charging battery can 100% release voltage.

According to the above objects, the car-used spare power system quick charging device of the present invention includes a switch, a boosting circuit, a detecting circuit, an indicating circuit, an unstable circuit, a pulse cutting circuit and multiple charging batteries. The detecting circuit serves to detect the voltage state of the charging battery. The indicating circuit serves to indicate the voltage state of the charging battery detected by the detecting circuit. The switch is used to switch the charging/discharging, modes. When the charging battery is detected to be in middle or low voltage state, the boosting circuit serves to boost the charging battery into high voltage. The charging battery charges/discharges the car battery by way of pulse so as to protect the charging battery from damage due to over-heating and make the charging battery 100% release voltage.

The present invention can be best understood through the following description and accompanying drawings wherein:

DETAILED DESCRIPTION OF THE PREFERRED EMBODIMENT

Figure 1:
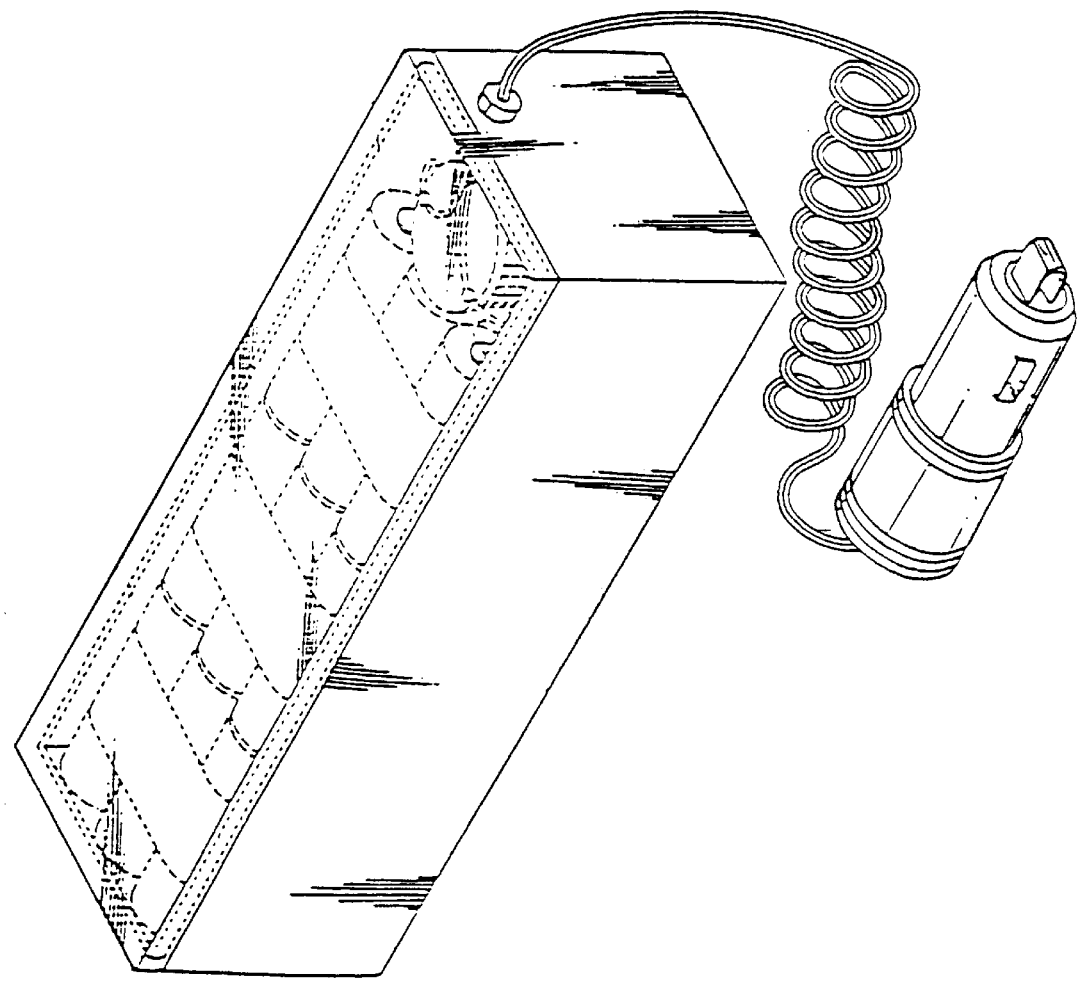
FIG. 1 is a perspective view of a conventional charger.
Figure 2:
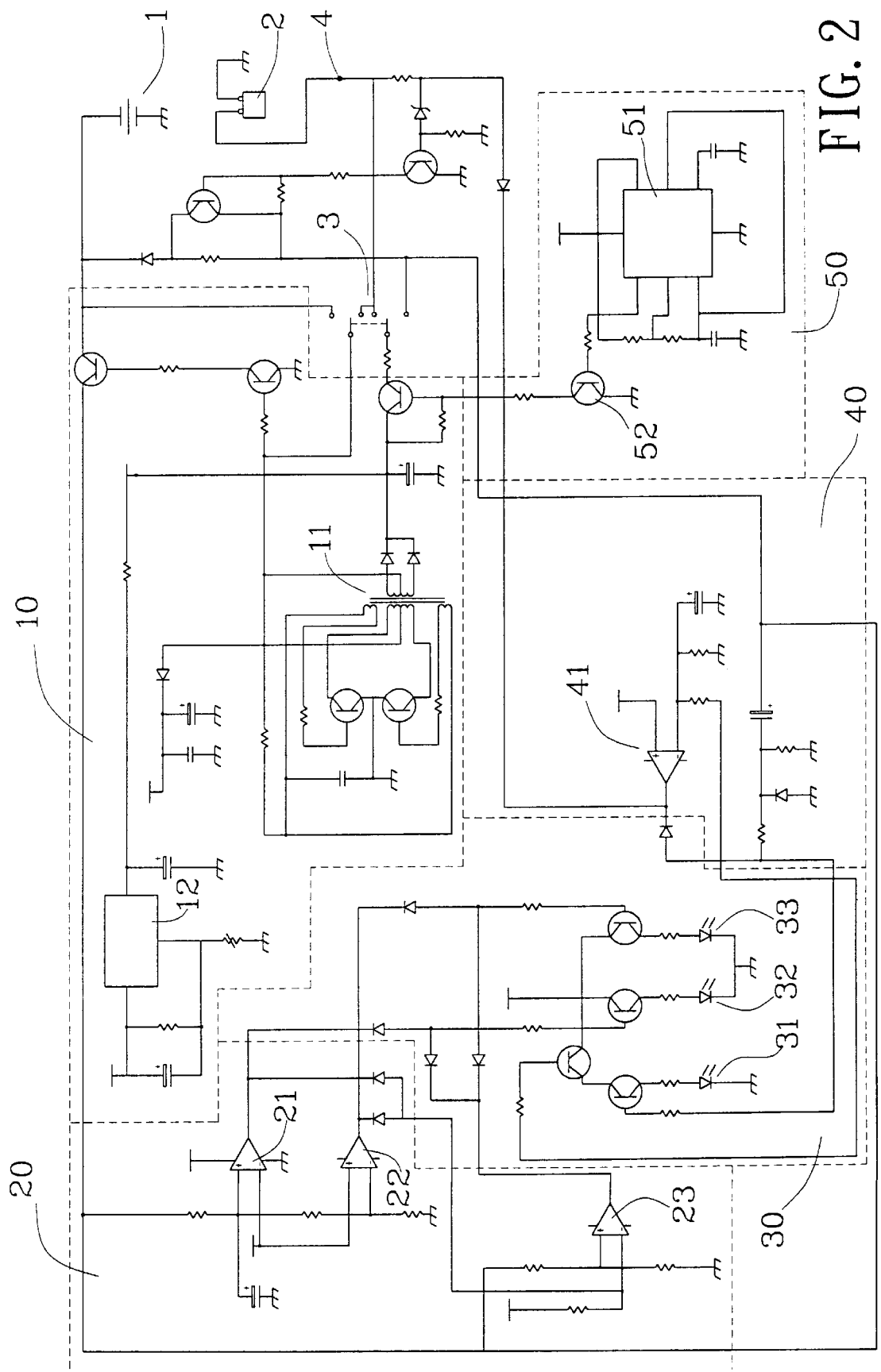
FIG. 2 is a circuit diagram of the charging device of the present invention.
Figure 3:
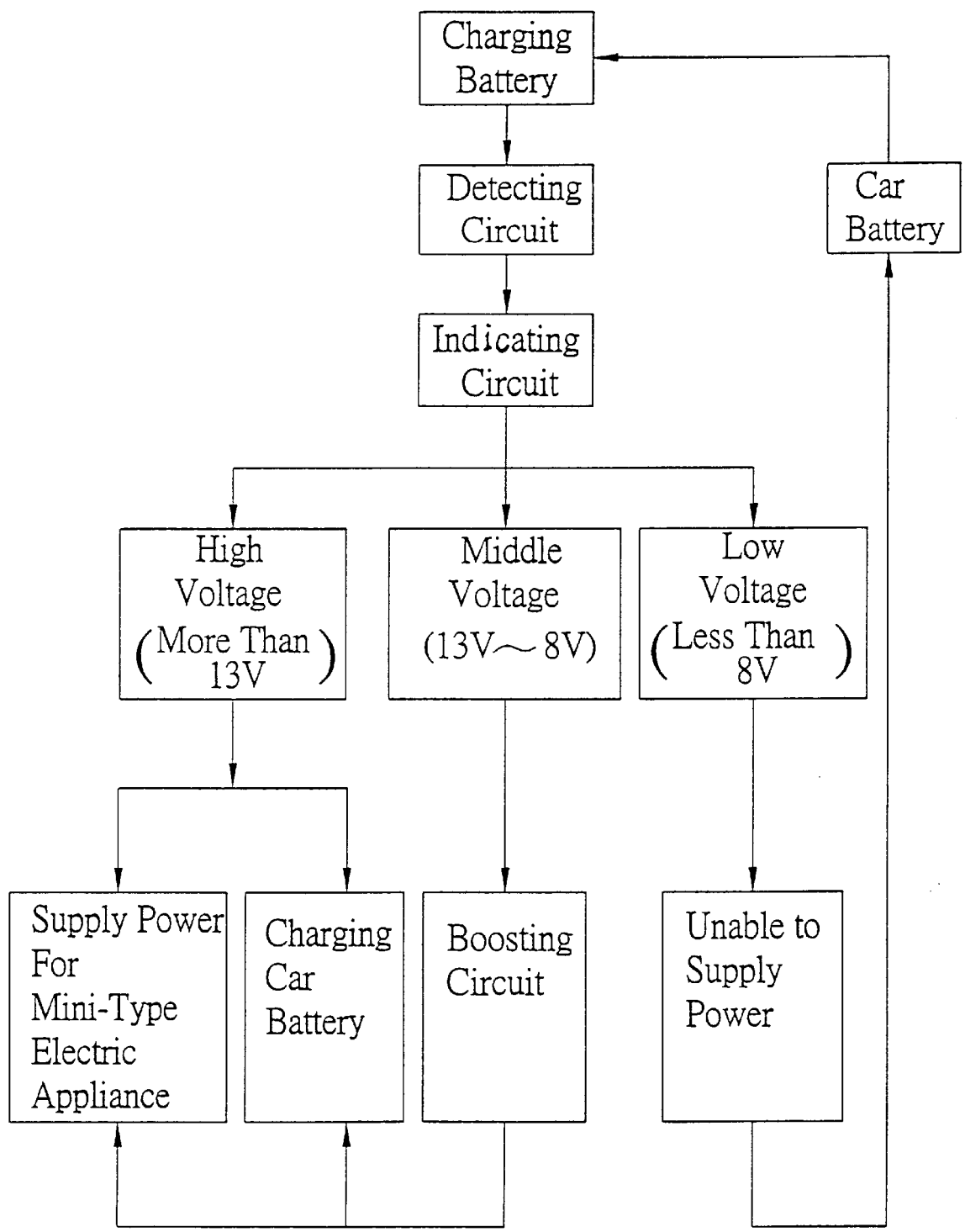
FIG. 3 is a flow chart of the present invention.

Please refer to FIGS. 2 and 3. The car-used spare power system quick charging device of the present invention includes a boosting circuit 10, a detecting circuit 20, an indicating circuit 30, a pulse cutting circuit 40 and an unstable circuit 50.

A switch 3 SW1 is connected with the charged battery 1, boosting circuit 10 and the car battery 2. The indicating circuit 30 indicates the voltage state of the charging battery 1 for selecting the charging/discharging time.

The detecting circuit 20 is composed of multiple resistors and diodes, a capacitor and three comparators 21, 22, 23 for detecting the voltage state of the charging battery 1.

The indicating circuit 30 is composed of multiple transistors, diodes, resistors and light emitting diodes 31 LED1 (green), 32, 33 LED2 (red), (green) for indicating the voltage state of the charging battery detected by the detecting circuit 20.

The boosting circuit 10 is composed of multiple transistors, resistors, capacitors, diodes, a variable resistor, a voltage-stabilizing IC and a transformer 11. When the charging battery 1 is detected by the detecting circuit 20 to be in middle or low voltage state, the boosting circuit 10 serves to boost the battery 1 into high voltage.

The unstable circuit 50 is composed of multiple resistors, capacitors, a transistor 52 and a 555 timer 51. An output end of the 555 timer 51 is connected to the transistor 52 and an output end of the boosting circuit 10. The pulse-wave generated by the oscillation of the 555 timer 51 controls whether the transistor 52 is energized or not so as to further control the boosting circuit 10 to output by way of pulse.

The pulse cutting circuit 40 is composed of multiple resistors, capacitors, diodes and a comparator 41 for switching less current.

In load-free condition, there are three states of the charging battery I detected by the detecting circuit 20 and indicated by the indicating circuit 30 as follows:

1. LED2 33 emits a green light to indicate that the charging battery 1 is saturated in a high voltage state (over 13V±0.2V). At this time, The switch 3 SW1 is switched to an ON discharging state. At the same time, the unstable circuit 50 oscillates to generate pulse-wave, making the charging battery 1 by way of pulse charge the car battery 2 via the output/input end 4 or via the lighter socket supply power for other mini-type electric appliances.

2. LED2 32 and 33 emits an orange light to indicate that the charging battery 1 is saturated in a middle voltage state (13V to 8V). At this time, The switch 3 SW1 is upward switched to ON (discharging) state, making the boosting circuit 10 start to boost the middle voltage into a high voltage. At the same time, the unstable circuit 50 oscillates to generate pulse-wave, making the charging battery 1 by way of pulse charge the car battery 2.

3. LED2 32 emits a red light to indicate that the charging battery 1 is saturated in a low voltage state (below 8.0±0.2V). At this time, the charging battery 1 is unable to charge the car battery 2 or supply power for mini-type electric appliances. Therefore, the switch 3 SW1 is downward switched to an ON (charging) state. At this time, the car battery starts to charge the charging battery 1 until the LED1 stops flickering. At this time, the pulse cutting circuit 40 automatically lowers the input current into low current to continuously charge the charging battery 1 into a saturated state.

The above embodiment is only used to illustrate the present invention, not intended to limit the scope thereof. Many modifications of the above embodiment can be made without departing from the spirit of the present invention.

What is claimed is:

1. A car-used spare power system quick charging device comprising:
   a switch connected with a charged battery, boosting circuit and car battery for selecting the charging/discharging time;
   a detecting circuit for detecting the voltage state of the charging battery;
   an indicating circuit for indicating the voltage state of the charging battery detected by the detecting circuit;
   a boosting circuit for boosting the charging battery into high voltage;
   an unstable circuit for generating pulse-wave to the output of the boosting circuit; and
   a pulse cutting circuit for detecting and switching less current.

2. A car-used spare power system quick charging device as claimed in claim 1, wherein the detecting circuit includes two comparators for comparing voltage of the charging battery with voltage of the car battery.

3. A car-used spare power system quick charging device as claimed in claim 1, Wherein the boosting circuit includes a transformer.

4. A car-used spare power system quick charging device as claimed in claim 1, wherein the unstable circuit generates pulse-wave.

* * * * *